United States Patent
Irie et al.

(10) Patent No.: US 7,141,221 B2
(45) Date of Patent: Nov. 28, 2006

(54) APPARATUS FOR PROCESSING PERFLUOROCARBON

(75) Inventors: Kazuyoshi Irie, Hitachi (JP); Toshihiro Mori, Tokai-mura (JP); Hisao Yokoyama, Hitachioota (JP); Takayuki Tomiyama, Hitachi (JP); Toshihide Takano, Tomobe-machi (JP); Shin Tamata, Ooarai-machi (JP); Shuichi Kanno, Hitachi (JP)

(73) Assignees: Hitachi, Ltd., Tokyo (JP); Hitachi Engineering Co., Ltd., Hitachi (JP); Hitachi Kyowa Engineering Co., Ltd., Hitachi (JP)

( * ) Notice: Subject to any disclaimer, the term of this patent is extended or adjusted under 35 U.S.C. 154(b) by 713 days.

(21) Appl. No.: 09/855,673

(22) Filed: May 16, 2001

(65) Prior Publication Data

US 2001/0031228 A1    Oct. 18, 2001

Related U.S. Application Data

(62) Division of application No. 09/190,853, filed on Nov. 12, 1998, now abandoned.

(30) Foreign Application Priority Data

Nov. 14, 1997 (JP) .................................. 9-313089
May 27, 1998 (JP) ................................. 10-145748

(51) Int. Cl.
    *B01D 53/34* (2006.01)
(52) U.S. Cl. ..................... 422/172; 422/173; 422/177
(58) Field of Classification Search ........ 422/168–173, 422/177, 180, 188–191, 193, 194, 198, 211, 422/222; 588/205, 206; 423/240 R, 240 S; 438/719, 725
    See application file for complete search history.

(56) References Cited

U.S. PATENT DOCUMENTS

| | | | | |
|---|---|---|---|---|
| 5,417,934 A | * | 5/1995 | Smith et al. ................. | 422/177 |
| 5,649,985 A | * | 7/1997 | Imamura ..................... | 96/275 |
| 5,674,797 A | * | 10/1997 | Seppanen et al. ............. | 502/33 |
| 5,955,037 A | * | 9/1999 | Holst et al. .................. | 422/171 |
| 6,022,489 A | * | 2/2000 | Izumikawa et al. ..... | 252/182.32 |
| 6,030,591 A | * | 2/2000 | Tom et al. ............... | 423/240 S |
| 6,069,291 A | * | 5/2000 | Rossin et al. ................ | 588/206 |

FOREIGN PATENT DOCUMENTS

| | | |
|---|---|---|
| JP | 10-192653 | 7/1998 |
| JP | 10-252651 | 9/1998 |
| JP | 11-70322 | 3/1999 |
| JP | 11-244656 | 9/1999 |

* cited by examiner

Primary Examiner—Kevin P. Kerns
(74) Attorney, Agent, or Firm—Antonelli, Terry, Stout and Kraus, LLP.

(57) ABSTRACT

An exhaust gas containing a perfluoride component (PFC) and $SiF_4$ is conducted into a silicon remover and brought into contact with water. A reaction water supplied from a water supplying piping and air supplied from an air supplying piping are mixed with the exhaust gas exhausted from the silicon remover. The exhaust gas containing water, air, and $CF_4$ is heated at 700° C. by a heater. The exhaust gas containing PFC is conducted to a catalyst layer filled with an alumina group catalyst. The PFC is decomposed to HF and $CO_2$ at a high temperature exhausted from the catalyst layer is cooled in a cooling apparatus. Subsequently, the exhaust gas is conducted to an acidic gas removing apparatus to remove HF. In this way, the silicon component is removed from the exhaust gas before introducing the exhaust gas into the catalyst layer. Therefore, the surface of the catalyst can be utilized effectively, and the decomposition reaction of the perfluoride compound can be improved.

10 Claims, 7 Drawing Sheets

APPARATUS FOR PROCESSING PERFLUOROCARBON

This application is a Divisional application of Ser. No. 09/190,853, filed Nov. 12, 1998, the contents of which are incorporated herein by reference in their entirety.

BACKGROUND OF THE INVENTION

The present invention relates to a method of processing perfluorocarbon and an apparatus therefor, and more particularly, the invention relates to a preferable method for use in processing perfluorocarbon (hereinafter, called PFC) contained in an exhaust gas from a semiconductor manufacturing plant, and an apparatus therefor.

In a known semiconductor manufacturing process, various uses are made of PFC gases, which are harmless to a human being, are non-explosive, and are easy to handle, such as $CF_4$ and the like, which are used as an etchant in a dry etching process, and $C_2F_6$ and the like, which are used as a cleaning gas in a CVD process. These PFC gases are ionized by a plasma discharge of a high voltage after being introduced into an etching apparatus or a CVD apparatus, and are used to perform etching or cleaning of wafers in an active radical state.

However, the amount of PFC gas actually consumed in the etching or the cleaning is several % to tens % by volume.

The rest of the PFC gas is exhausted outside the system in an unreacted state.

TABLE 1

| No | PFC gas | Warm coeff.[1] | Life.[2] (year) | Toxic. react.[3] | Consume in Japan (t/year) | Main use |
|---|---|---|---|---|---|---|
| 1 | $CF_4$[4] | 6,300 | 50,000 | low-toxic. non-flam.[5] | 300('94) 394('95) | Etching gas:75% CVD cleaning gas: 25% |
| 2 | $CF_6$[6] | 12,500 | 10,000 | low-toxic. non-flam.[5] | 4('94) 200('95) | P-CVD cleaning gas |
| 3 | $CF_3$[7] | 9.720 | 179 | toxic | 25('94) 39('95) | CVD cleaning gas: 92% IC-Etching gas: 8% |
| 4 | $CHF_3$[8] | 12,100 | 250 | — | 55('94) | dry etching |
| 5 | $C_4F_8$[9] | 8.700 | 3,200 | — | — | etching |
| 6 | $C_3F_8$[10] | 7,000 | 2,600 | — | — | P-CVD cleaning gas |
| 7 | $SF_6$[11] | 24,900 | 3,200 | — | 26('94) | dry etching: 90% CVD cleaning gas: 10% |

Remarks:
[1] Warming-up coefficient
[2] Life time in atmosphere
[3] Toxicity and reactivity
[4] Flon 14
[5] Non-flammable
[6] Flon 116
[7] Nitrogen trifluoride
[8] Flon 23
[9] Flon C 318
[10] Flon 218
[11] Sulfur hexafluoride Because a fluorine atom has a small atomic radius and a strong bonding force, PFC, a compound of fluorine atoms, has stable characteristics. PFC includes flon, such as FC (fluorocarbon) and HFC (hydrofluorocarbon), which do not include chlorine, and perfluoride compounds, such as nitrogen trifluoride ($NF_3$) and sulfur hexafluoride ($SF_6$). Main materials of PFC, and their characteristics and main use, are indicated in Table 1.

PFC exists stably in the atmosphere for a long time, and, because it does not contain chlorine, its molecular structure is compact, and its bonding force is strong. For instance, the life of $CF_4$ is as long as 50,000 years, the life of $C_2F_6$ is 10,000 years, and the life of $SF_6$ is 3,200 years. However, PFC has a large warming-up coefficient. In comparison with $CO_2$, $CF_4$ is 6,500 times, $C_2F_6$ is 9,200 times, and $SF_6$ is 23,900 times. Therefore, although a smaller amount of PFC is released than $CO_2$, which is required to be decreased since it is a cause of warming-up of the earth, it is anticipated that the release of PFC will be certainly restricted in the near future. In this case, a countermeasure against release of the exhaust gas from semiconductor manufacturing plants, which is the source of a majority of the PFC being released, will become an important consideration.

For instance, in an etching step performed in a semiconductor manufacturing plant, a PFC gas for etching is supplied into a chamber. A part of the PFC gas is converted to highly corrosive fluorine atoms by applying a plasma thereto. The fluorine atoms perform an etching of silicone wafers. The exhaust gas from the chamber is pumped out continuously by a vacuum pump. In order to prevent corrosion by the acidic gas, purging of the exhaust gas with nitrogen gas is performed. The exhaust gas contains nitrogen in the amount of 99% and PFC in a residual amount of 1%, which has not been used for the etching. The exhaust gas pumped out by the vacuum pump is conducted to an acid removing apparatus, through the duct for removing the acidic gas, and is released into the atmosphere in a state in which it contains PFC.

In the semiconductor manufacturing plants, a reagent method and a combustion method have been used practically as a method of decomposition of PFC. The former is a method wherein fluorine is chemically fixed at approximately 400–900° C. by using a special reagent. In accordance with this method, exhaust gas processing is not necessary, because no acidic gas is generated by the decomposition. The latter is a method wherein the PFC gas is conducted to a combustor and is decomposed thermally in a flame of at least 1,000° C. generated by combustion of LPG and propane gas.

In accordance with the above reagent method, the reagent which is reacted chemically with the PFC can not be re-used, and the expensive reagent, which is consumed in the reaction as a consumable article, is required to be supplied frequently. Therefore, the operation cost is 10 to 20 times in comparison with that of the combustion method. Furthermore, because an amount of the reagent equivalent to the amount of the PFC to be processed is necessary, practical equipment for performing the reagent method requires a large area, such as approximately 3–5 $m^2$.

In accordance with the above combustion method, thermal decomposition is performed at a high temperature, such as at least 1,000° C. for $C_2F_6$ and at least 1,100° C. for $CF_4$, and a large amount of thermal energy is required. Furthermore, the combustion method generates NOx and a large amount of $CO_2$ by combustion at a high temperature. Because the PFC is exhausted in a state in which it is diluted with inactive $N_2$ gas, a potential for miss-fire is high, and a sufficient operation control is required.

An application of the combustion method to the semiconductor manufacturing process has been studied. The PFC is exhausted as a mixed gas diluted with $N_2$ gas having a concentration of several %. Accordingly, in the combustion of the mixed gas, a large amount of air for combustion is required in addition to a fuel gas. Consequently, because the amount of gas to be processed is increased, the size of the apparatus is increased, and the area for the apparatus is required to be as large as approximately 0.7–5 $m^2$.

For instance, when $C_2F_6$ is contained in the amount of 1% in an exhaust gas exhausted at 100 liter/min. from a semiconductor manufacturing process, the necessary amount of LPG to make the thermal decomposition temperature at temperature at least 1,000° C. is 10 liter/min. and the necessary amount of air is approximately 400 liter/min. with an excessive ratio of 1.5. The total amount of the exhaust gas after the combustion becomes approximately 500 liter/min., because oxygen in the air is consumed and $CO_2$ is generated at a rate of 30 liter/min. The total amount of the exhaust gas is increased almost 5 times that of the exhaust gas exhausted from the semiconductor manufacturing process. The typical semiconductor manufacturing plant has a large restriction on space, because the plant must be provided with clean rooms. Accordingly, it is difficult to keep the necessary area for installing a new exhaust gas processing apparatus in a previously built semiconductor manufacturing plant. on the other hand, a catalytic method, wherein PFC is decomposed at approximately 400° C., has been applied to CFC (chlorofluorocarbon) and HCFC (hydrochlorofluorocarbon), which have similar chemical compositions with PFC and an ozone destruction effect. Because CFC and HFC contain chlorine atoms having a large atomic radius in their compositions, the molecular structures composed by bonding fluorine atoms and hydrogen atoms having a small atomic radius are distorted. Therefore, CFC and HFC can be decomposed at a relatively low temperature.

A method of decomposing CFC (or HFC) using a catalyst was disclosed in JP-A-9-880 (1997). In accordance with this method, a mixed gas of heated air, which is made up of a carrier gas, steam and CFC, is conducted to a catalyst layer. The temperature of the catalyst layer is approximately 430° C., because CFC has a low decomposition temperature. The exhaust gas containing decomposed gases exhausted out of the catalyst layer is cooled rapidly with cooling water, in order to prevent generation of dioxine.

SUMMARY OF THE INVENTION

The object of the present invention is to provide a method of processing perfluorocarbon using a catalyst, which can improve the decomposition reaction, and an apparatus therefor.

A first feature of the invention is in the steps of removing silicon components from an exhaust gas containing a perfluoride compound and the silicon components, and, subsequently, supplying the exhaust gas containing the perfluoride compound, to which any of water or steam is added, to a catalyst layer which is filled with a catalyst, to decompose the perfluoride compound with the catalyst.

In accordance with the first feature of the invention, a closing of the pores formed on the catalyst by solid particles generated by a reaction of the silicon components in the exhaust gas with the water or the steam added to the exhaust gas can be prevented, because the silicon components in the exhaust gas to be supplied to the catalyst is removed previously. Furthermore, in accordance with the first feature of the invention, choking intervals formed among the catalysts by the solid particles can be prevented. Accordingly, since the surface of the catalysts can be utilized effectively, the decomposition reaction of the perfluoride compound can be improved by this first feature of the invention. The decomposition efficiency of the perfluoride compound can be improved as well.

A second feature of the invention is in the step of removing acidic gas from a cooled exhaust gas. In accordance with this step, the acidic gas contained in the exhaust gas is decreased significantly.

A third feature of the invention is in the steps of removing silicon components from the exhaust gas by using a first silicon components removing apparatus and a second silicon components removing apparatus. The exhaust gas which flows out from the first silicon components removing apparatus is supplied to the second silicon components removing apparatus to bring the exhaust gas into contact with water in the second silicon components removing apparatus. In the first silicon components removing apparatus, the exhaust gas containing silicon components is brought into contact with waste water from the second silicon components removing apparatus and cooling water contacted with the exhaust gas containing a decomposed gas.

Because the waste water from the second silicon components removing apparatus and cooling water contacted by the exhaust gas containing the decomposed gas are contacted by the exhaust gas containing silicon components in the first silicon components removing apparatus, a part of the silicon components contained in the exhaust gas is removed with a mixed water of the waste water and the cooling water. Therefore, the amount of fresh water to be supplied to the second silicon components removing apparatus can be decreased, and the overall amount of waste water to be processed is decreased. Furthermore, since the silicon components contained in the exhaust gas are processed twice so as to be removed by the first and second silicon components removing apparatus, respectively, the efficiency of removal of the silicon components is improved.

A fourth feature of the invention resides in the use of an alumina group catalyst as the catalyst for decomposing the perfluoride compound.

Because an alumina group catalyst is used, the perfluoride compound can be decomposed effectively and conveniently at a reaction temperature in the range of 650–750° C.

DETAILED DESCRIPTION OF THE PREFERRED EMBODIMENTS

Figure 2:
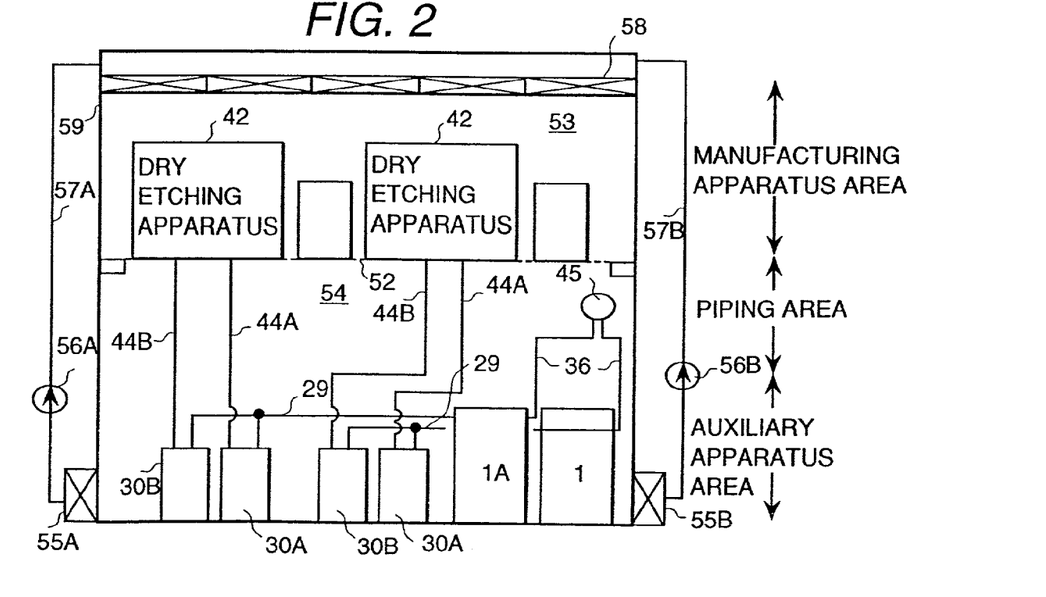
FIG. 2 is a schematic diagram showing the composition of a clean room, wherein the dry etching apparatus and the perfluoride compound processing apparatus indicated in FIG. 1 are arranged.
Figure 3:
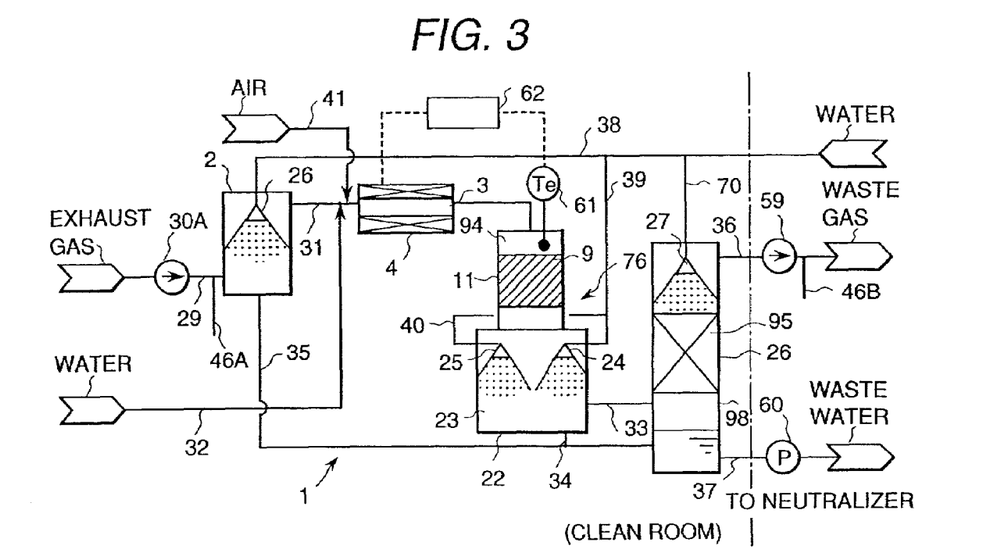
FIG. 3 is a schematic diagram of the perfluoride compound processing apparatus indicated in FIG. 1 and FIG. 2.

A perfluoride compound processing apparatus (PFC gas processing apparatus), i.e. a preferred embodiment of the present invention applied to an exhaust gas control system of an etching apparatus in a semiconductor manufacturing plant, will be explained hereinafter with reference to FIG. 1, FIG. 2, and FIG. 3.

PFC does not contain chlorine, and so its molecular structure is compact, its bonding force is strong, and its decomposition temperature is as high as approximately 700° C. Therefore, the catalytic method (disclosed in JP-A-9-880 (1997)), which could be applied to CFC and HFC, could not be applied to PFC. However, currently, the present inventors have succeeded in development of an alumina group catalyst having a reaction temperature at approximately 700° C. which is applicable to the decomposition of PFC. Regarding the above catalyst, patent applications have been filed in the Japanese Patent office as Japanese Patent Applications No. Hei 9-4349 (filed Jan. 14, 1997) and No. Hei 9-163717 (filed Jun. 20, 1997). In accordance with the present embodiments, the above catalyst is used for processing the exhaust gas.

Figure 1:
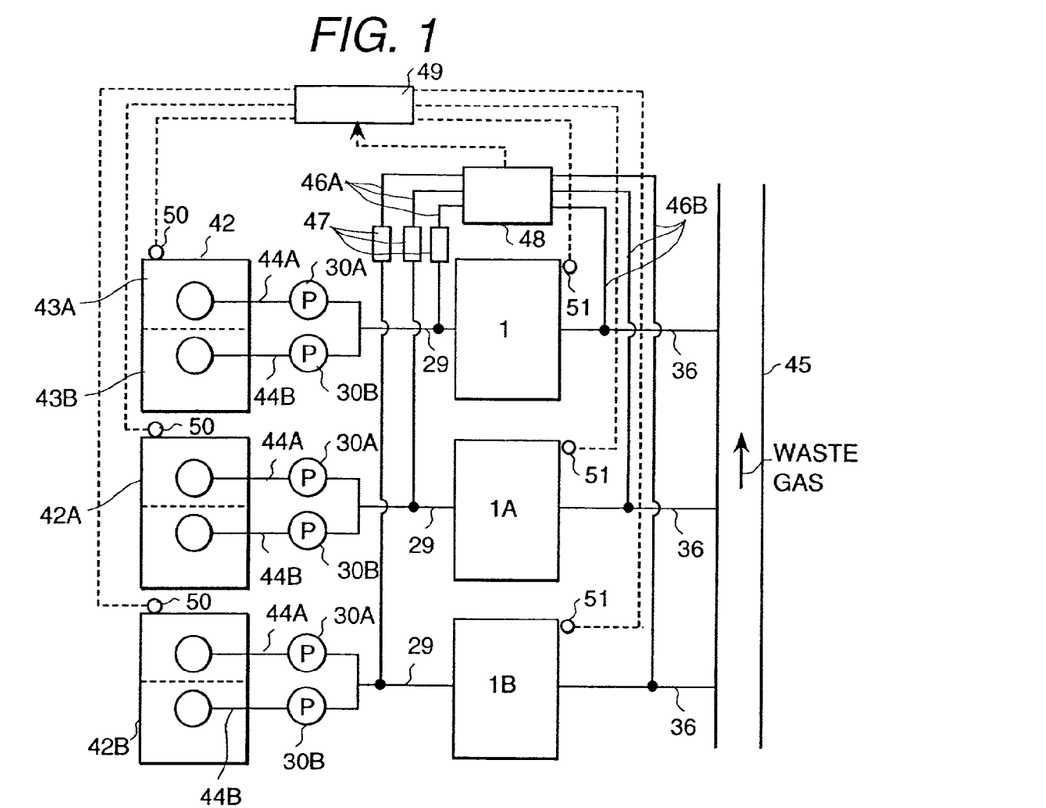
FIG. 1 is a schematic diagram of an exhaust gas control system for a dry etching apparatus in a semiconductor manufacturing plant, in which a preferable embodiment of the present invention, i.e. a perfluoride processing apparatus, is applied thereto.

In accordance with the exhaust gas control system of a dry etching apparatus, for instance, each PFC processing apparatus 1, 1A, 1B, is connected to a respective one of three dry etching apparatus 42, 42A, 42B, as indicated in FIG. 1. Each of the dry etching apparatus comprises two etching regions 43A, 43B, partitioned in the apparatus.

In each of the etching regions, an etching process is performed for wafers by supplying $CF_4$, i.e. a PFC gas, as an etching gas. The exhaust gas from the etching regions 43A, 43B, is conducted to a PFC processing apparatus 1 through piping 44A, 44B, 29, by driving vacuum pumps 30A, 30B. The exhaust gas contains approximately 1% of $CF_4$, which has not been consumed in the etching process, and $SiF_4$ generated by the etching process. The exhaust gas is exhausted to the duct 45 after being processed in the PFC processing apparatus 1 through the piping 36. The exhausted gases from other dry etching apparatus 42A and 42B are also conducted to the duct 45 in the same way.

The exhaust gas in the piping 29 and the exhaust gas in the piping 36 is conducted to a gas chromatography unit 48 by sampling piping of 46A and 46B, respectively. An acid gas filter 47 is provided in the sampling piping 46A. Concentrations of $CF_4$ in the exhausted gases supplied to and exhausted from the PFC processing apparatus 1 are determined by the gas chromatography unit 48. The determined values on the concentration of $CF_4$ in the exhausted gases are input from the gas chromatography unit 48 to a monitoring apparatus 49. When the concentration of $CF_4$ in the exhausted gas in the piping 36 is higher than a first preset value, the monitoring apparatus 49 generates an alarm sound with flashing of a warning device 51 of the corresponding PFC processing apparatus for providing a warning of an abnormal state. When the concentration of $CF_4$ in the exhausted gas in the piping 29 is higher than a second preset value, the monitoring apparatus 49 generates an alarm sound with flashing of a warning device 50 of the corresponding dry etching apparatus 42 for providing a warning of an abnormal state. Furthermore, the monitoring apparatus 49 checks for a normality of the catalytic reaction in the reactor 9, which will be explained later, and a catalyst change timing from deterioration of the catalyst, based on a decomposition ratio obtained from the concentrations of $CF_4$ at the entrance and the outlet of the PFC processing apparatus 1.

Next, an approximate arrangement of the above-mentioned exhaust gas control system in the clean rooms of the semiconductor manufacturing plant will be explained hereinafter with reference to FIG. 2. A building 59 of the semiconductor manufacturing plant is composed of clean rooms 53, 54, arranged above and below a grating 52, respectively. Air in the clean room 54 is cleaned by filters 55A, 55B and is conducted to the clean room 53 through the piping 57A, 57B by driving blowers 56A, 56B. The air is cleaned again by a filter 58. The clean room 53 has a higher cleanliness than the clean room 54. The dry etching apparatus 42 is installed in the clean room 53, i.e. a manufacturing apparatus area. The PFC processing apparatus 1, 1A, and the like, and the vacuum pumps 30A, 30B, are installed in the auxiliary apparatus area in the clean room 54. The piping, such as piping 44A, duct 45, and the like, are arranged at the piping area above the auxiliary apparatus area in the clean room 54.

Figure 5:
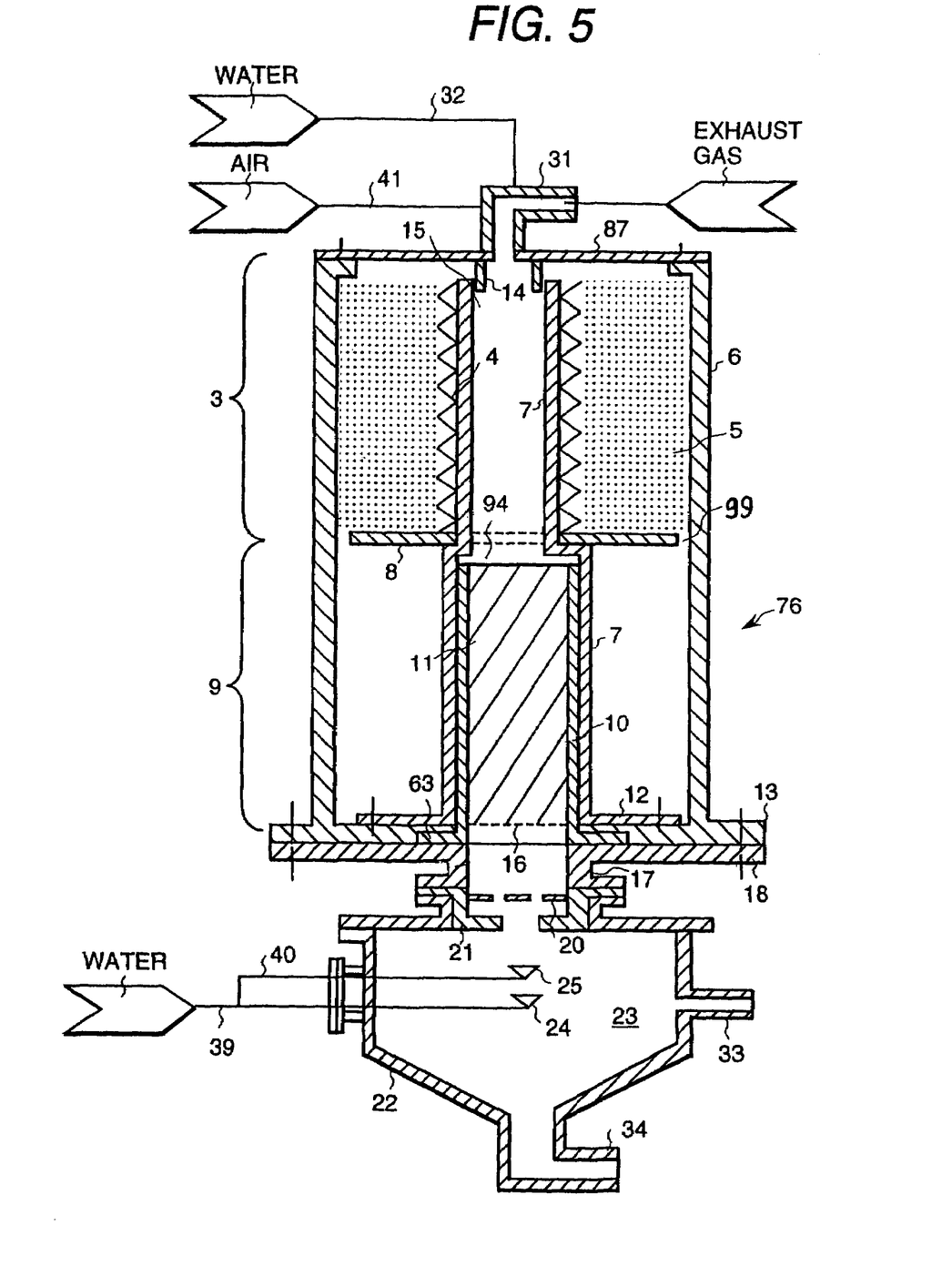
FIG. 5 is a vertical cross section of the PFC decomposition processing unit indicated in FIG. 3.

A composition of the PFC processing apparatus will be explained hereinafter with reference to FIG. 3. The compositions of the PFC processing apparatus 1A, 1B, are the as same as the composition of the PFC processing apparatus 1. The PFC processing apparatus comprises a silicon remover 2, a heating apparatus 3, a reactor containing a catalyst layer 11, a cooling apparatus 22, an acidic gas removing apparatus 98, a blower 59, a waste water pump 60, and a temperature controller 62. The exhaust gas exhausted from the blower 30A is conducted to the duct 45 through the silicon remover 2, the heating apparatus 3, the reactor 9, the cooling apparatus 22, the acidic gas removing apparatus 98, and the blower 59. The heating apparatus 3, the reactor 9, and the cooling apparatus 22 are assembled in an integral body, as indicated in FIG. 5, to form a PFC decomposition processing unit 76.

Figure 4:
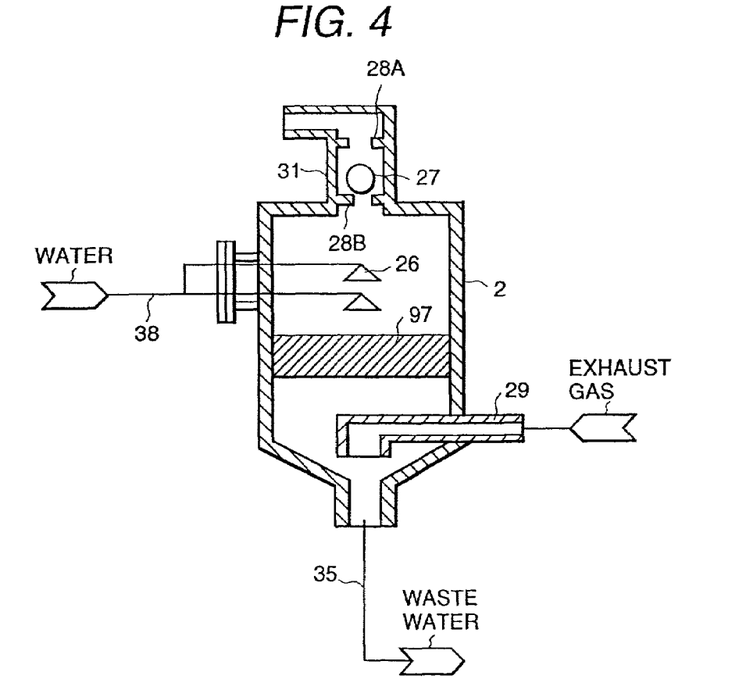
FIG. 4 is a vertical cross section of the silicon remover indicated in FIG. 3.

The detailed composition of the silicon remover 2 is indicated in FIG. 4. The silicon remover 2 comprises a spray 26 and a diffusion portion 97 filled with packing materials inside the vessel. The exhaust gas containing $CF_4$, $SiF_4$, and the like as impurities is conducted into the vessel of the silicon remover 2 via the piping 29. The exhaust gas outlet of the piping 29 in the vessel is oriented downwards. The exhaust gas flows upwards in the vessel, and passes through the diffusion portion 97 to diffuse and to flow in the vessel. Cooling water supplied from a water supplying pipe 38 is sprayed through the spray 26. The diffusion portion 97 increases the contacting ratio of the sprayed water and the exhaust gas, and improves the performance for removal of the impurities as explained later.

A reaction expressed by the following equation (1) is generated by bringing the $SiF_4$ contained in the exhaust gas into contact with the sprayed water, whereby the $SiF_4$ contained in the exhaust gas is decomposed to $SiO_2$ and HF.

$$SiF_4+2H_2O=>SiO_2+4HF \tag{1}$$

The generated $SiO_2$ is in the form of fine particles of a solid body, and is removed from the exhaust gas by the sprayed water concurrently with its generation. HF has a large solubility in water, and is removed from the exhaust gas by dissolution into water. The waste water containing $SiO_2$ and HF is conducted to the bottom portion of the acid gas removing apparatus 26 and through the piping 35. The impurities accompanied with the exhaust gas can be removed, not by spraying with water, but by contacting them with water by a bubbling method.

Because the outlet of the exhaust gas piping 29 is oriented downwards, sprayed water from the spray 26 is prevented from splashing and back flowing into the piping 26. The vessel of the silicon remover 2 is made of vinyl chloride, which is corrosion resistant against HF, in order to protect the vessel from the corrosion by HF, which is generated by the reaction expressed by the equation (1).

A ball check valve 27 is provided at the exhaust gas outlet portion of the silicon remover 2. The ball check valve 27 is arranged between the ring shaped protrusion 28A and the protrusion 28B. Therefore, the silicon remover 2 made of vinyl chloride is protected from receiving thermal damage by a back flow of hot gas from downstream, i.e. the heating apparatus 3, when the operation of the PFC processing apparatus 1 is stopped.

The exhaust gas flowing out from the silicon remover 2 is conducted to the PFC decomposition processing unit 76 through the piping 31.

Detailed composition of the PFC decomposition processing unit 76 is indicated in FIG. 5. The PFC decomposition processing unit 76 comprises a heating apparatus 3, a reactor 9, and a cooling apparatus 22. A casing 6 and an internal tube 7 are shared between the heating apparatus 3 and the reactor 9. The diameter of the internal tube 7 is smaller at the upper portion than at the lower portion thereof. A lid 87 to be connected to the piping 31 is provided on the upper end of the casing 6. A flange 12 of the internal pipe 7 is fixed to the flange 13 of the casing 6 by bolts. The heating apparatus 3 and the reactor 9 are composed to form an integral body structure. The upper end portion of the internal tube 7 is restricted in moving in a horizontal direction by a cylindrical portion 14 provided on the lid 87. A ring shaped plate 8 is provided on the internal tube 7. The heating apparatus 3 comprises a electric heater 4 and a thermal insulating material 5 covering the heater is arranged above the ring shaped plate 8. The heater 4 and the insulating material 5 are arranged between the casing 6 and the internal tube 7. A gap 99 is formed between the casing 6 and the ring shaped plate 8. The gap 99 prevents the casing 6 from conducting the heat of the high temperature exhausted gas (700° C.) from the internal tube 7 and the ring shaped plate 8 and releasing the heat outside the casing 6. That means that a heat loss of the exhaust gas can be reduced. The structure of the PFC processing apparatus 1 can be simplified by forming an integral body structure with the heating apparatus 3 and the reactor 9.

The reactor 9 is arranged at a position below the ring shaped plate 8. The reactor 9 comprises a catalyst cartridge 10 containing a catalyst layer 11 formed by filling an alumina group catalyst on a metallic mesh 16.

The alumina group catalyst is a catalyst containing $Al_2O$, of 80% and $NiO_2$ of 20%. The catalyst cartridge 10 is inserted into the internal tube 7. A cylinder 17 is fixed to the casing 6 by joining the flange 18 with the flange 13. The flange 63 of the catalyst cartridge 10 is confined and held by the flange 13. The reactor 9 comprises a heater for keeping the reactor at a desired temperature (not shown in the figure) and is arranged between the casing 6 and the internal tube 7. A baffle holder 21 holding a baffle 20 is fixed to the cylinder 17. The cooling apparatus 22 is arranged beneath the baffle holder 21 and is fixed to the baffle holder 21. Sprays 25 and 26 are provided inside the casing of the cooling apparatus 22.

Reaction water, or steam, supplied from the water supplying pipe 32, and air supplied from the air supplying pipe 41 are mixed with the exhaust gas in the piping 31. The water is supplied into the exhaust gas, because the chemical reaction expressed by the equation (2) explained later is a hydrolysis reaction. The amount of water, or steam, supplied is approximately 25 times per one mole of $CF_4$. The exhaust gas containing water, air, and $CF_4$ is heated indirectly by the electric heater 4 while flowing through a path 15 in the heating apparatus 3. Then, the water is converted to steam. The exhaust gas is heated by the electric heater 4 to approximately 700° C., i.e. a temperature for the decomposition of $CF_4$ and preferably proceeds in the catalyst layer. The temperature control apparatus 62 controls the current flowing in the electric heater 4 so that the temperature Te of the exhaust gas determined by the thermometer 61 at the inlet portion 94 of the reactor 9 becomes a preset temperature. This temperature control is used in each of the following embodiments. The temperature of the catalyst layer 11 can be maintained at the reaction temperature by the above temperature control. In the case of $CF_4$, the temperature is maintained in the range of approximately 650–750° C.

The heated exhaust gas containing $CF_4$ is supplied to the reactor 9 filled with the catalyst. The $CF_4$ in the exhaust gas reacts with $H_2O$ and is decomposed to HF and $CO_2$ by the effect of the alumina group catalyst in the catalyst layer 11 as expressed by the following equation (2):

$$CF_4+2H_2O=>CO_2+4HF \tag{2}$$

In the case when $C_2F$, one type of PFC, is contained in the exhaust gas, $C_2F_6$ is decomposed to $CO_2$ and HF by the reaction expressed by the following equation (3):

$$C_2F_6+2H_2O=>2CO_2+6HF \tag{3}$$

Figure 6:
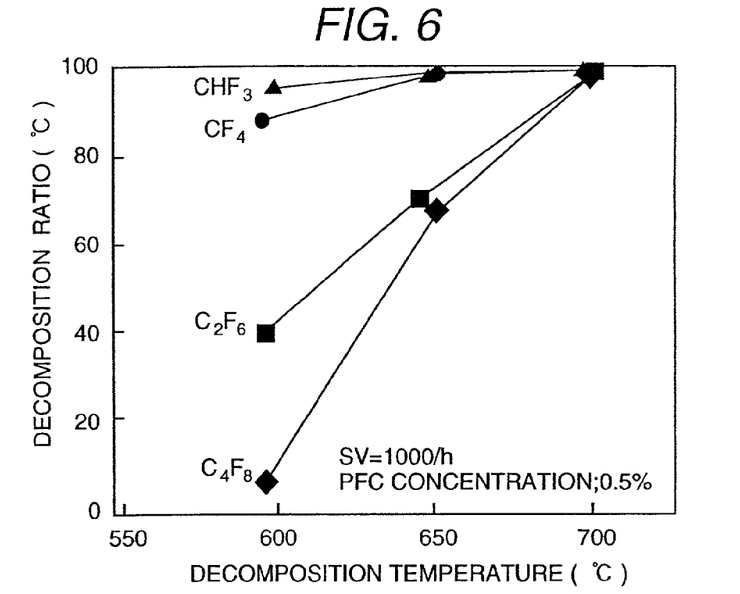
FIG. 6 is a graph indicating decomposition characteristics of various PFC by the alumina group catalyst.

FIG. 6 is a graph indicating decomposition characteristics of PFC by the alumina group catalyst, and the abscissa indicates decomposition temperature and the ordinate indicates decomposition rate. The alumina group catalyst used in the measurement had the composition explained previously. Tested gases were four kinds of PFC were tested, including $CHF_3$, $CF_4$, $C_2F_6$ and $C_4F_8$. As the testing conditions, the concentration of a respective PFC was 0.5%, and SV was 1000/h. The reaction water was added in an amount approximately 10 times that of the theoretical amount. As FIG. 6 reveals, all four PFC indicated a decomposition rate near 100% at a reaction temperature of approximately 700° C. The decomposition rate of $CF_4$ and $CHF_3$ at approximately 650° C. was equal to or more than 95%, and the decomposition rate of $C_2F$, and $C_4F$, at approximately 670° C. was equal to or more than 80%. By using the above catalysts, practical decomposition of a PFC in the range of approximately 650–750° C. is possible.

The high temperature exhaust gas, containing decomposed gases such as $CO_2$ and HF exhausted from the catalyst layer 11, is conducted to the cooling region 23 in the cooling apparatus 22 through the baffle 20.

The cooling water supplied throughout the water supplying piping 39 and 40 are sprayed continuously in to the cooling region 23 by the sprays 24 and 25. The exhaust gas at a high temperature is cooled to 100° C. or lower by the sprayed water. A part of the HF is removed from the exhaust gas by dissolving it into the cooling water. The cooling of the exhaust gas at a high temperature can be achieved not only by spraying, but also by bubbling the gas into a water tank. The sprayed water is conducted to a lower portion of the acidic gas removing apparatus 98 through the piping 34 and 35. By providing the baffle 20, the path for conducting the exhaust gas from the baffle holder 21 to the cooling apparatus 22 becomes zigzag, and a back flow of the splashed cooling water sprayed from the sprays 24 and 25 into the catalyst layer 11 can be prevented. Therefore, a temperature drop of the catalyst layer 11 caused by the splashed water can be prevented, and a release of undecomposed PHC can be avoided.

The exhaust gas containing the decomposed gases ($CO_2$ and HF) at a low temperature, which is exhausted from the cooling apparatus 22, is conducted to the acidic gas removing apparatus 98 through the piping 33. The acidic gas removing apparatus 98 comprises a packed layer 95 filled with Raschig rings made of plastics and a spray 27 inside for removing HF contained in the decomposed gas at a high concentration, such as approximately 4% by volume. The spray 27 is arranged above the packed layer 95. The cooling water supplied through the water supply piping 70 is sprayed through the spray 27 and flows down through the packed layer 95. The exhaust gas comes into sufficient contact with the cooling water in the packed layer 95 that a majority of the HF contained in the exhaust gas can be dissolved into the cooling water. The HF in the exhaust gas can be removed significantly by the acidic gas removing apparatus 98 in concentrations from 4% by volume to a several ppm.

The exhaust gas, the acidic gas content of which is decreased remarkably, is conducted to the duct 45 through the piping 36 by operating a blower 59 and is released to the outside of the system. The insides of the cooling apparatus 22 and the acidic gas removing apparatus 98 are kept at a negative pressure by the operation of the blower 59. Thus, the possibility that hazardous HF contained in the exhaust gas will leak to the outside of the system can be prevented. The bubbling method also can be applied to the acidic gas removing apparatus 98. However, with the spraying method, the pressure loss is smaller than that of the bubbling method, and the capacity of the blower 59 can be made smaller.

The waste water generated at the silicon removing apparatus 2, the cooling apparatus 22, and the acidic gas removing apparatus 98 is collected at a lower portion of the acidic gas removing apparatus 98. The waste water contains impurities, such as $SiO_2$, HF, and others. The waste water is conducted to a neutralizer (not shown in the drawing) though the piping 37, by operating the waste water pump 60, and is processed. In accordance with the present embodiment, the solid particles such as $SiO_2$ are not carried into the catalyst layer 11 in the reactor 3, because the silicon components contained in the exhaust gas have been previously removed by the silicon remover 2 as $SiO_2$. If the silicon remover 2 is not provided, $SiO_2$ is generated by the reaction expressed by the equation (1) with the water supplied from the water supplying piping 32 at a portion downstream from the joining point of the piping 31 and the water supplying piping 32. When the $SiO_2$ flows into the catalyst layer 11, the following problems (1) and (2) are caused:

(1) Pores formed on the catalysts are closed by the $SiO_2$
(2) Intervals formed among the catalysts are choked. On account of the above problems (1) and (2), the surface of the catalyst is decreased, and the decomposition reaction of the PFC is decreased.

Furthermore, because of the above problem (2), the flow of the exhaust gas in the catalyst is decreased, and the contact of the catalyst with the exhaust gas is hindered. This causes a decrease in the decomposition reaction of the PFC. In accordance with the present embodiment, $SiO_2$ is previously removed from the exhaust gas by generating the reaction expressed by the equation (1) at the silicon remover 2, and, accordingly, the above problems are not generated and the efficiency of decomposition of the PFC can be improved.

In accordance with the present embodiment, the decomposition processing of the PFC can be achieved with a high efficiency by using the catalyst, and the release of PFC, which is one of the gases causing warming-up of the earth, into the atmosphere can be avoided. Furthermore, unreacted CO generated by the decomposition of $CF_4$ with the catalyst can be converted to harmless CO, by mixing air into the exhaust gas.

In accordance with the present embodiment, $CF_4$ can be decomposed at a sufficiently lower temperature than the conventional combustion method. Accordingly, necessary utilities, such as heat energy, water, and the like can be decreased. Application of the present embodiment to a semiconductor manufacturing plant is advantageous even as a safety aspect against a fire hazard, because the temperature of the decomposed gas is low. The catalyst has a long life, and a recycle use of the catalyst is possible. Therefore, the operation cost of the plant can be decreased significantly in comparison with the reagent method.

When an end of life of the catalyst is reached, the catalyst cartridge 10 is replaced with a new catalyst cartridge. The exchanging operation will be explained hereinafter with reference to FIG. 7. The catalyst cartridge 10 is held by a flange 13 by fitting a protrusion 64 of a flange 63 into a groove 65 formed inside the flange 13. For detaching and attaching the catalyst cartridge 10, a cartridge detaching and attaching apparatus 66 is used. The cartridge detaching and attaching apparatus 66 comprises a lifter 68, a rotatable base 67 fixed rotatably to the lifter 68, and a rotary handle 69.

Figure 7:
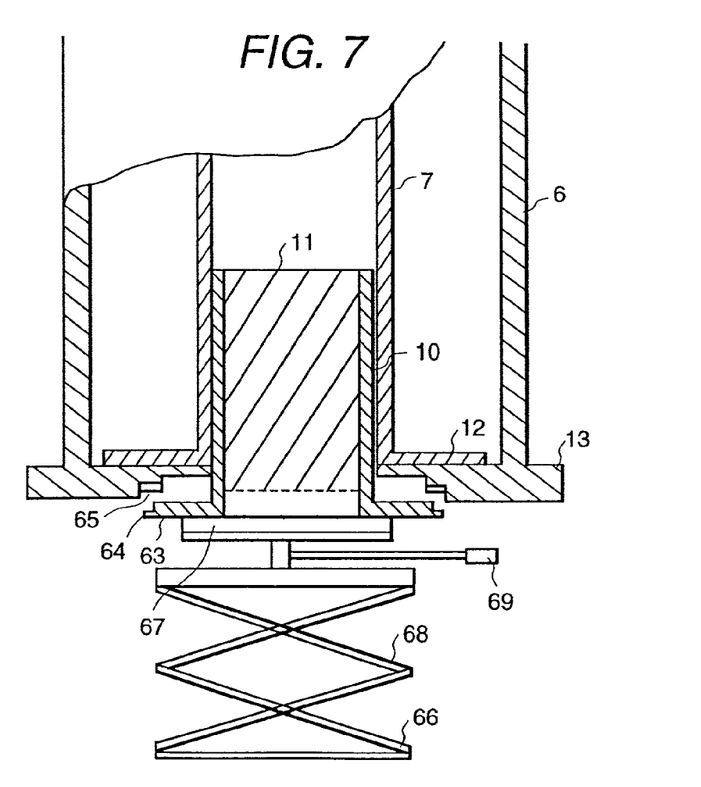
FIG. 7 is a partial vertical cross section indicating an exchanging operation of a catalyst cartridge indicated in FIG. 5.

After detaching the cylinder 17, the baffle holder 2 1, and the cooling apparatus 22 from the casing 6, the cartridge detaching and attaching apparatus 66 is placed under the catalyst cartridge 10. The rotatable base 67, is elevated by the lifter 68. A rubber plate adhered on the surface of the rotatable base is brought into contact with the flange 63. The rotatable base is rotated by operation of the rotary handle 69. The rotating force is transmitted to the catalyst cartridge 10 via the rubber plate. When the protrusion 64 is moved to a designated position, rotation of the rotatable base 67 is stopped, and the lifter is retracted. The protrusion 64 is detached from the groove 65, and the catalyst cartridge 10 is disassembled from the flange 13 and withdrawn from the internal tube 7.

Then, a new catalyst cartridge 10 is placed on the rotatable base 67. The new catalyst cartridge 10 is inserted into the internal tube 7 by a procedure opposite to that of the detaching operation and is attached to the flange 13. The protrusion 64 of the new catalyst cartridge 10 is adjusted to the above designated position by rotating the rotatable base 67. After elevating the lifter 68 somewhat, the protrusion 64 is fitted into the groove 65 by rotating the rotatable base 67 by operating the rotary handle 69. The cylinder 17, the baffle holder 21, and the cooling apparatus 22 are attached to the casing 6. Then, the PFC decomposition processing by the PFC decomposition a processing unit 76 becomes available again.

The exchange of the catalyst cartridge 10 can be performed readily by using the cartridge detaching and attaching apparatus 66. Because operators do not touch a hot spent catalyst cartridge 10, the operators are protected from burning. Because the hot spent catalyst cartridge 10 can be detached readily, the time necessary for the exchanging the catalyst cartridge 10 can be decreased significantly. Because spreading of catalyst particles and generation of dust by the exchanging operation can be prevented, a carrying out of the exchanging operation in the clean room becomes possible.

The present embodiment can be applied to cases of decomposition of the various substances indicated in Table 1, such as $CF_4$, $CHF_3$, $C_2F_6$ and $C_4F_8$. These substances can be decomposed at a reaction temperature of approximately 700° C. using an alumina group catalyst. The present embodiment can be applied to the decomposition of $C_2F_6$ contained in the exhaust gas from a CVD apparatus, and PFC contained in the exhaust gas from an etching apparatus for a liquid crystal display, in addition to the PFC contained in the exhaust gas obtained from a dry etching apparatus in a semiconductor manufacturing plant.

An exhaust gas control system for a dry etching apparatus for use in semiconductor manufacturing, wherein a PFC processing apparatus of another embodiment of the present invention is applied, will be explained hereinafter. The exhaust gas control system of the present embodiment is composed in the same manner as the system indicated in FIG. 1 and FIG. 2 except that each of the PFC processing apparatus, such as apparatus 1, 1A, and the like, are replaced with a PFC processing apparatus 1C indicated in FIG. 8. The PFC processing apparatus 1C has the same composition as the PFC processing apparatus 1, except that the silicon remover 2 in the PFC processing apparatus 1 is replaced with a silicon removing apparatus 71, and a return piping 75 is newly added. The silicon removing apparatus 71 comprises silicon removers 2 and 72. The silicon remover 72 comprises a spray 73, and a diffusion portion 74 filled with packing materials inside a vessel. The silicon remover 72 has the same composition as the silicon remover 2 indicated in FIG. 4. The outlet of the piping 29 is oriented downwards in the silicon remover 72. The ball check valve 27 is not provided at the outlet side of the silicon remover 72. The return piping 75 is connected to the piping 37 downstream of the waste water pump 60. The vessel of the silicon remover 72 is composed of corrosion resistant vinyl chloride, in order to prevent corrosion by HF.

Figure 8:
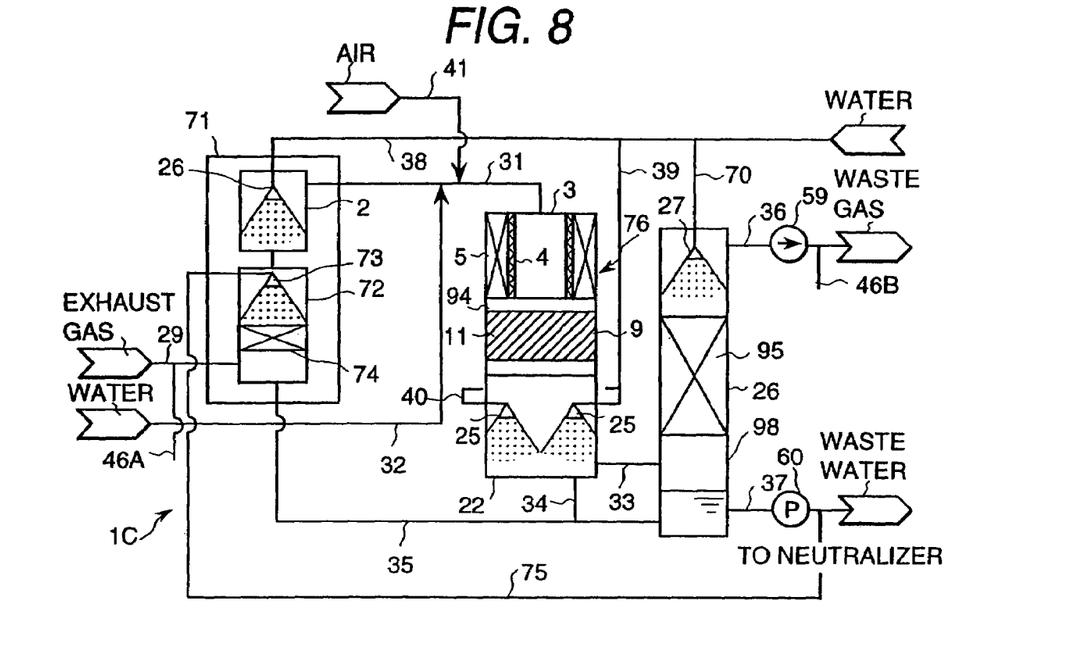
FIG. 8 is a schematic diagram of another embodiment of the perfluoride processing apparatus indicated in FIG. 1.

The exhaust gas containing $CF_4$, $SiF_4$, and the like is conducted into the vessel of the silicon remover 72 through the piping 29. The exhaust gas ascends in the vessel and flows inside the vessel by diffusion through the diffusion portion 74. A part of the waste water pumped out by the waste water pump 60 and supplied via return piping 75 is sprayed through the spray 73. The concentration of respective F ions and Si ions in the waste water pumped out from the waste water pump 60 are less than tens of ppm. The waste water has a sufficient performance for removing the Si and HF. By causing a part of the $SiF_4$ contained in the exhaust gas to contact the sprayed waste water, the reaction expressed by the equation (1) occurs. The generated $SiO_2$ is removed from the exhaust gas by the waste water, and the HF is dissolved into the waste water.

The exhaust gas exhausted from the silicon remover 72 is conducted to the silicon remover 2. Fresh water supplied through the water supply piping 38 is sprayed through the spray 26 of the silicon remover 2. By causing the residual $SiF_4$ contained in the exhaust gas to contact the sprayed water, the reaction expressed by the equation (1) occurs in the silicon remover 2. The waste water containing the $SiO_2$ and HF is conducted to the silicon remover 72 and is mixed with the sprayed waste water from the spray 73. The mixed waste water is conducted to the bottom portion of the acidic gas removing apparatus 98 through the piping 35. The processes at other portions of the PFC processing apparatus 1C are the same as the processing in the PFC processing apparatus 1.

The PFC processing apparatus 1C generates the same advantages as the advantages obtained by the PFC processing apparatus 1. Furthermore, the PFC processing apparatus 1C has additional advantages as follows. That is, because the amount of the fresh water supplied through the water supply piping 38 in the PFC processing apparatus 1C is decreased, the amount of waste water conducted to the neutralizer (not shown in the figure) is decreased. Furthermore, since the reaction expressed by the equation (1) is generated at two portions in the silicon removers 2 and 72, the removing efficiency of the Si components such as $SiF_4$ and the like contained in the exhaust gas, is improved.

Figure 9:
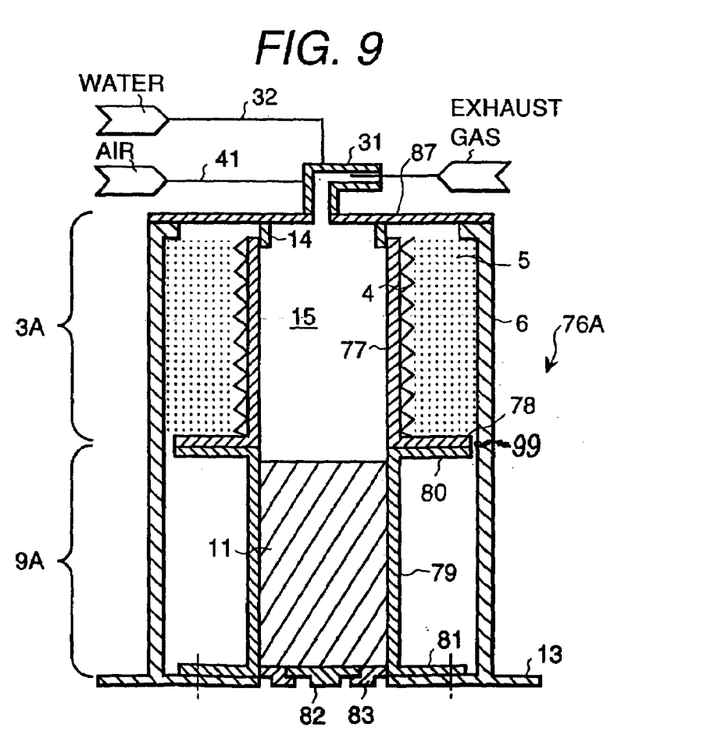
FIG. 9 is a vertical cross section of another embodiment of the PFC decomposition processing unit.

Another embodiment of the PFC decomposition processing unit is indicated in FIG. 9. The PFC decomposition processing unit 76A of the present embodiment comprises a heating apparatus 3A and a reactor 9A. The cylinder 17, the baffle holder 21, and the cooling apparatus 22 of the PFC decomposition processing unit 76 are also used in the PFC decomposition processing unit 76A and are arranged on the flange 13 in the casing 6 in the above order. The reactor 9A comprises a bottom portion 83 in an internal tube 79. A bottom plate 82 is provided at the bottom portion 83 as a slidable member. The catalyst layer 11 filled with the alumina group catalyst is formed on the bottom plate 82 and the bottom portion 83 in the internal tube 79. The alumina group catalyst is a catalyst containing $Al_2O_3$ 80% and $NiO_2$ 20%. A flange 81 of the internal tube 79 is fixed to the flange 13.

The heating apparatus 3A comprises an internal tube 77, the electric heater 4, and the insulating material 5 covering the electric heater 4. The electric heater 4 and the insulating material 5 are arranged between the internal tube 77 and the casing 6. A flange 78 of the internal tube 77 is fixed to the flange 80. A gap 16 is formed between the casing 6 and the flanges 78 and 81.

The catalyst which reaches the end of its life can be taken out from inside the internal tube 79 by detaching the cylinder 17, the baffle holder 21, and the cooling apparatus 22, and removing the bottom plate 82. The functions of the heating apparatus 3A and the reactor 9A are the same as the functions of the heating apparatus 3 and the reactor 9 of the PFC decomposition processing unit 76. The same advantages as provided by the PFC decomposition processing unit 76 can be obtained by the PFC decomposition processing unit 76A.

Figure 10:
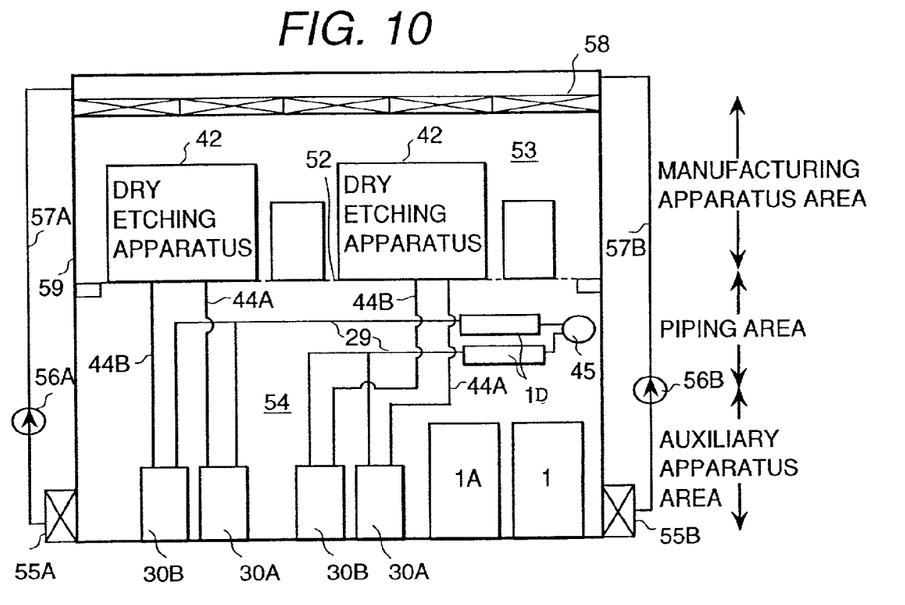
FIG. 10 a schematic diagram of another embodiment of the clean room, wherein another embodiment of the perfluoride compound processing apparatus and dry etching apparatus are arranged.

An exhaust gas control system for the dry etching apparatus in a semiconductor manufacturing plant, to which the other embodiment of the PFC processing apparatus of the present invention is applied, will be explained hereinafter with reference to FIG. 10, FIG. 11, and FIG. 12. In accordance with the exhaust gas control system of the present embodiment, plural PFC processing apparatus 1D are arranged in a clean room 54. This differs from the embodiments indicated in FIG. 1 and FIG. 2. Each of the PFC processing apparatus 1D is connected to separated piping 29, respectively.

Figure 11:
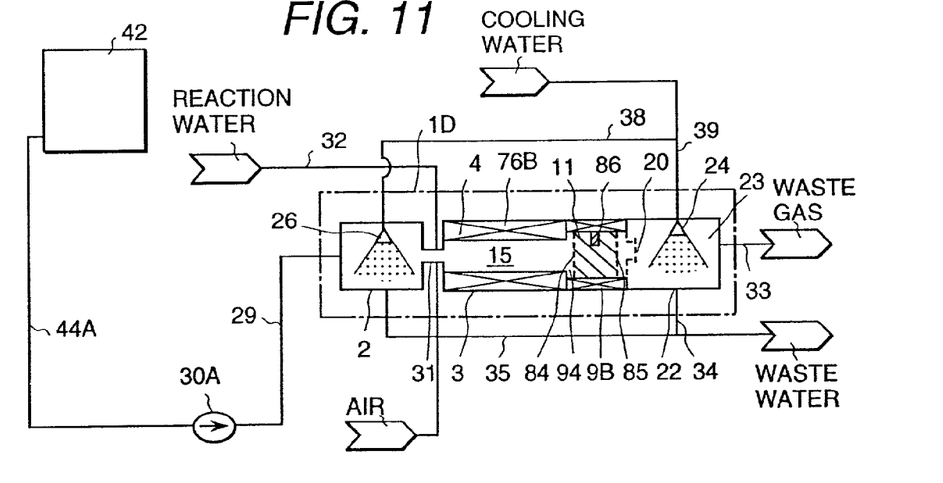
FIG. 11 is a schematic diagram of the perfluoride compound processing apparatus indicated in FIG. 10.
Figure 12:
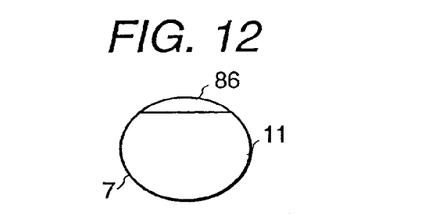
FIG. 12 is a cross section in the vicinity of the baffle plate indicated in FIG. 11.

Details of the PFC processing apparatus ID are indicated in FIG. 11. The PFC processing apparatus ID is of the horizontal type, and comprises the silicon remover 2 and the PFC decomposition processing unit 76B. The silicon remover 2 is connected to the piping 29. The PFC decomposition processing unit 76B comprises the heating apparatus 3, a reactor 9B, and the cooling apparatus 22. The PFC decomposition processing unit 76B does not comprise the acidic gas removing apparatus 98. In accordance with the present embodiment, the acidic gas removing apparatus 98 is provided in the duct 45. The heating apparatus 3 of the PFC decomposition processing unit 76B is composed only by arranging the heating apparatus 3 of the PFC decomposition processing unit 76 in a horizontal direction. The reactor 9B comprises plural holding plates 84 and 85, which are perforated with a large number of small holes, in the internal tube 7. The catalyst layer 11 is composed by packing and holding the alumina group catalyst (containing $Al_2O$, 80% and $NiO_2$ 20%) between the holding plate 84 and the holding plate 85. A baffle plate 86 is arranged above the catalyst layer 11, as indicated in FIG. 12, and is attached to the inside of the internal tube 7. The baffle 20 is provided inside the cooling apparatus 22. The functions of the heating apparatus 3, the reactor 9B, and the cooling apparatus 22 of the present embodiment are the same as the functions of the heating apparatus 3, the reactor 9, and the cooling apparatus 22 of the PFC decomposition processing unit 76.

The PFC processing apparatus 1D provides the same advantages as the PFC processing apparatus 1, except for the lack of a contribution of an acidic gas removing apparatus 98. Furthermore, the PFC processing apparatus 1D can be made compact, because it is arranged in a horizontal direction without providing the acidic gas removing apparatus 98. Accordingly, the PFC processing apparatus 1D can be installed in an existing semiconductor manufacturing plant, which may scarcely have an extra margin in space for installing such apparatus. That is, the PFC processing apparatus 1D can be installed in a piping area above the clean room 54. The PFC processing apparatus 1D requires only a small space for installation.

The level of the catalyst in the catalyst layer 11 somewhat with the passage of time; therefore, a slight interval is formed between the upper surface of the catalyst layer 11 and the inner surface of the internal tube 7. Because the baffle plate 86 is arranged in the catalyst layer 11, by-passing undecomposed PFC gas through this slight interval to the cooling apparatus 22 can be prevented. The PFC gas is certainly passed through the catalyst layer 11 and decomposed.

Another embodiment of the exhaust gas control system of dry etching apparatus for use in a semiconductor manufacturing plant will be explained hereinafter. The exhaust gas control system of the present embodiment is composed by replacing each of the PFC processing apparatus in the exhaust gas control system indicated in FIG. 1 and FIG. 2 with the PFC processing apparatus 1E indicated in FIG. 13. The PFC processing apparatus 1E comprises the silicon remover 2, a PFC decomposition processing unit 76C, and an acidic gas removing apparatus 98, which is not shown in FIG. 13. The PFC processing apparatus 1E is formed by replacing the PFC decomposition processing unit 78 in the PFC processing apparatus 1 with the PFC decomposition processing unit 76C.

Figure 13:
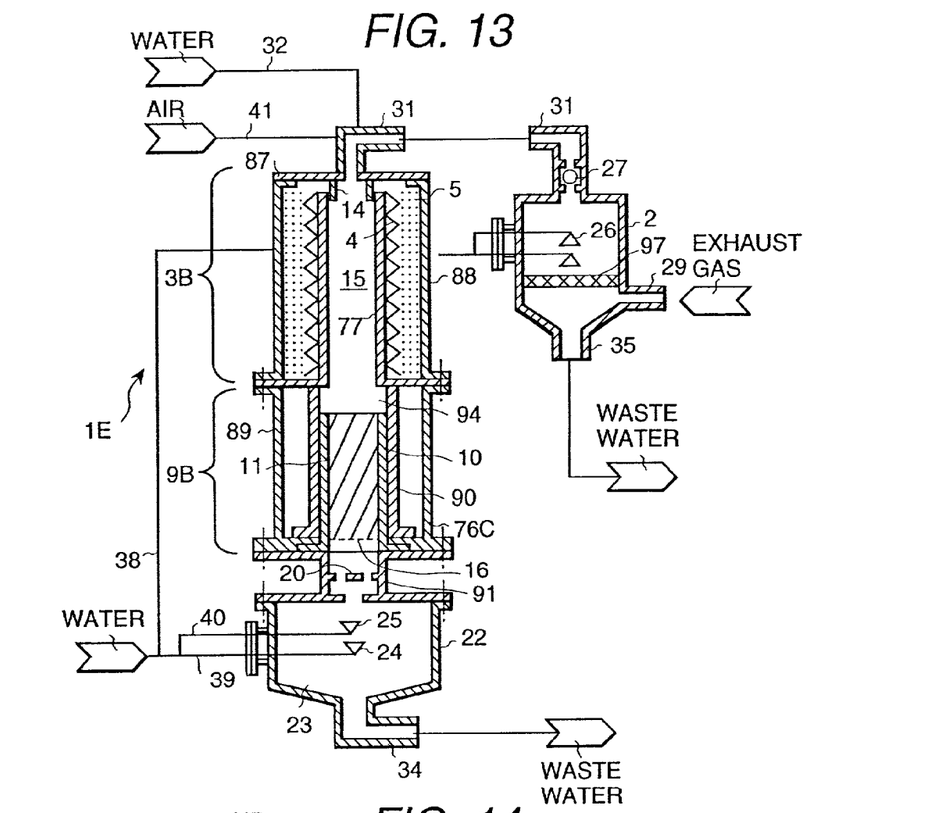
FIG. 13 is a vertical cross section of another embodiment of the perfluoride compound processing apparatus indicated in FIG. 1.

Details of the PFC decomposition processing unit 76C will be explained hereinafter. The PFC decomposition processing unit 76C differs from the PFC decomposition processing unit 76 in the composition of the casing and the internal tube. The PFC decomposition processing unit 76C comprises a casing 88, a heating apparatus 3B for heating an internal tube 77, and a reactor 9B comprising a casing 89 and an internal tube 90. The heating apparatus 3B comprises the electric heater 4 and the insulating material 5 arranged between the casing 88 and the internal tube 77. In the reactor 9B, the catalyst cartridge 10 containing the catalyst layer 11 is inserted into the internal tube 90. The catalyst cartridge 10 is fitted to the flange at the lower end of the casing 89 in the same manner as in the PFC decomposition processing unit 76. The catalyst layer 11 is filled with the alumina group catalyst described previously. The baffle holder 91 comprising the baffle 20 connects the reactor 9B and the cooling apparatus 22. The flanges of the casing 88, the internal tube 77, and the casing 89 are connected by bolts.

The PFC processing apparatus 1E produces the same advantages as the PFC processing apparatus 1. By detaching the above flanges, the heating apparatus 3B can be separated readily from the reactor 9B. Disassembling the catalyst cartridge 10 can be performed in the as in same as the PFC decomposition processing unit 76.

Another embodiment of the exhaust gas control system of the dry etching apparatus in the semiconductor manufacturing plant will be explained hereinafter. The exhaust gas control system of the present embodiment is formed by replacing each of the PFC processing apparatus in the exhaust gas control system indicated in FIG. 1 and FIG. 2 with the PFC processing apparatus 1F indicated in FIG. 14. The PFC processing apparatus 1F is obtained by replacing the PFC decomposition processing unit 76 in the PFC processing apparatus 1C with the PFC decomposition processing unit 76D. In the PFC decomposition processing unit 76D, a heat exchanger 93 is arranged between the reactor 9 and the cylinder 17 of the PFC decomposition processing unit 76. A heat conducting tube 92 is arranged in the heat exchanger 93. The piping 32 is connected to the entrance side of the heat conducting tube 92. The piping 32A connected to the outlet side of the heat conducting tube 92 is connected to the piping 31 at a point upstream from the merging point of the piping 31 and the air supplying pipe 41.

Figure 14:
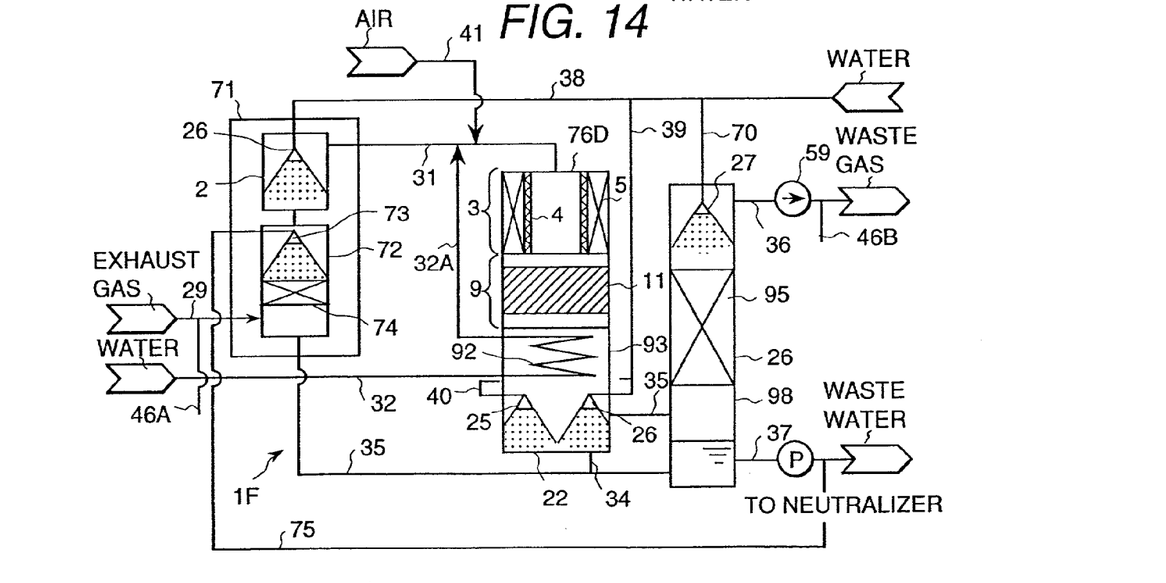
FIG. 14 is a schematic diagram of another embodiment of the perfluoride compound processing apparatus indicated in FIG. 1.

In accordance with the present embodiment, the reaction water supplied from the piping 32 is heated by the exhaust gas at approximately 700° C. exhausted from the catalyst layer 11 to be steam while flowing through the heat conducting tube 92. The steam is introduced into the piping 31 through the piping 32A. The exhaust gas containing steam, air, and $CF_4$, which is one type of PFC, is conducted to the catalyst layer 11 via the heating apparatus. Then, the reaction expressed by the equation (2) is generated in the catalyst layer 11.

The PFC processing apparatus 1F produces the same advantages as the PFC processing apparatus 1C. Furthermore, in accordance with the present embodiment, the heat of the exhaust gas at approximately 700° C. exhausted from the catalyst layer 11 can be recovered by the heat exchanger 93. Accordingly, the heating capacity of the heating apparatus 3, and the amount of the cooling water to be supplied to the sprays 25 and 26 in the cooling apparatus 23 can be decreased. In accordance with the present embodiment, the amount of waste water to be conducted to the neutralizer can be decreased to an amount smaller than that of the PFC processing apparatus 1C.

What is claimed is:

1. A perfluoride compound processing apparatus, comprising:
a silicon component removing apparatus for removing a silicon component from an exhaust gas containing a perfluoride compound and said silicon component,
a heating apparatus for heating said exhaust gas containing said perfluoride compound, to which at least one of water and steam is added after said exhaust gas has been exhausted from said silicon component removing apparatus,
a catalyst layer filled with a catalyst for decomposing said perfluoride compound contained in said exhaust gas exhausted from said heating apparatus, and
a cooling apparatus, located below said catalyst layer, for cooling said exhaust gas exhausted from said catalyst layer;
also comprising:
a cartridge having said catalyst layer formed inside; and
a casing wherein said cartridge is removably attached,
wherein said heating apparatus, said casing, and said cooling apparatus are formed in an integral body structure in the above order; and
further comprising a reactor which comprises said cartridge, an internal tube wherein said cartridge is contained, and said casing, and wherein said casing of said reactor is shared with a casing of said heating apparatus.

2. A perfluoride compound processing apparatus as claimed in claim 1, which further comprises:
a temperature detector for detecting a temperature of said exhaust gas exhausted from said catalyst layer, and
a controller for controlling said heating apparatus based on the temperature detected by the temperature detector.

3. A perfluoride compound processing apparatus as claimed in claim 1, which further comprises:
an acidic gas removing apparatus for removing acidic gas contained in said exhaust gas exhausted from said cooling apparatus.

4. A perfluoride compound processing apparatus as claimed in claim 1, wherein said silicon component removing apparatus comprises a spray apparatus for spraying water.

5. A perfluoride compound processing apparatus as claimed in claim 4, wherein said cooling apparatus comprises a spray apparatus for spraying cooling water for cooling said exhaust gas.

6. A perfluoride compound processing apparatus as claimed in claim 5, wherein:
said silicon component removing apparatus comprises a first silicon component removing apparatus, and a second silicon component removing apparatus to which said exhaust gas from said first silicon component removing apparatus is supplied,
a first spray apparatus for spraying water provided inside said second silicon component removing apparatus, and
a second spray apparatus for spraying both water sprayed from said first spray apparatus and water sprayed from said spray apparatus of said cooling apparatus.

7. A perfluoride compound processing apparatus as claimed in claim 4, wherein:
an exhaust gas inlet portion for supplying said exhaust gas containing a perfluoride compound and a silicon component to said silicon component removing apparatus is extended into said silicon component removing apparatus, and
a gas outlet opening of said exhaust gas inlet portion is provided at a position lower than said spray apparatus of said silicon component removing apparatus, and said gas outlet opening is oriented downwards in said silicon component removing apparatus.

8. A perfluoride compound processing apparatus as claimed in claim 7, wherein a diffusion portion for diffusing sprayed water from said spray apparatus of said silicon component removing apparatus is provided inside said silicon component removing apparatus between said spray apparatus of said silicon component removing apparatus and said exhaust gas inlet portion.

9. A perfluoride compound processing apparatus as claimed in claim 1, wherein a check valve, for preventing said exhaust gas from flowing back into said silicon component removing apparatus from said heating apparatus, is provided in a path conducting said exhaust gas from said silicon component removing apparatus to said heating apparatus.

10. A perfluoride compound processing apparatus as claimed in claim 1, wherein a heat exchanger for exchanging heat between the exhaust gas exhausted from said catalyst layer and water, and for generating said steam, is provided between said catalyst layer and said cooling apparatus.

* * * * *